US012609967B1

(12) United States Patent
Wu et al.

(10) Patent No.: US 12,609,967 B1
(45) Date of Patent: Apr. 21, 2026

(54) SYSTEM AND METHOD FOR UNIFIED ACCESS MANAGEMENT FOR FEDERATED TECHNOLOGY INFRASTRUCTURE

(71) Applicant: Morgan Stanley Services Group Inc., New York, NY (US)

(72) Inventors: Jun Wu, Shanghai (CN); Taiyi Zhang, Shanghai (CN); James McGuire, New York, NY (US); Boris Goberman, Fairlawn, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/381,655

(22) Filed: Nov. 6, 2025

(51) Int. Cl.
 *H04L 9/40* (2022.01)
(52) U.S. Cl.
 CPC .......... *H04L 63/20* (2013.01); *H04L 63/0209* (2013.01)
(58) Field of Classification Search
 CPC ............................. H04L 63/20; H04L 63/0209
 USPC ............................................................. 726/1
 See application file for complete search history.

(56) References Cited

U.S. PATENT DOCUMENTS

| | | | | |
|---|---|---|---|---|
| 9,959,397 | B1 * | 5/2018 | Kvamme | ................. H04L 63/08 |
| 10,798,084 | B1 | 10/2020 | Rose et al. | |
| 10,873,606 | B2 * | 12/2020 | Brannon | ............... G06F 21/577 |
| 11,314,611 | B2 | 4/2022 | Peddibhotla et al. | |
| 12,218,906 | B1 | 2/2025 | Zhong et al. | |
| 12,238,098 | B1 * | 2/2025 | Johnson | .................. G06F 21/41 |
| 12,267,368 | B1 | 4/2025 | Goberman et al. | |
| 2007/0233531 | A1 | 10/2007 | McMahon | |
| 2009/0254392 | A1 | 10/2009 | Zander | |
| 2012/0042354 | A1 * | 2/2012 | Vitiello | .................. G06Q 10/06 |
| | | | | 726/1 |
| 2017/0329957 | A1 | 11/2017 | Vepa et al. | |
| 2020/0274900 | A1 | 8/2020 | Vaishnavi | |
| 2022/0050835 | A1 | 2/2022 | Maichel et al. | |
| 2022/0210145 | A1 * | 6/2022 | Wrenbeck | ........... H04L 63/0884 |
| 2023/0090190 | A1 * | 3/2023 | Iila | ...................... H04L 63/0876 |
| | | | | 726/1 |
| 2023/0274022 | A1 * | 8/2023 | Mondal | ................. G06F 3/0653 |
| | | | | 726/26 |
| 2024/0160764 | A1 * | 5/2024 | Zaigouche | .......... G06F 16/2468 |
| 2024/0179238 | A1 * | 5/2024 | Tam | ........................ H04L 12/14 |

* cited by examiner

*Primary Examiner* — Thanh T Le
(74) *Attorney, Agent, or Firm* — K&L Gates LLP

(57) ABSTRACT

Computer-implemented methods and systems provide unified access management in a federated IT environment. The unified access management system comprises a first IAM system for a first legal entity and a second IAM system for a second legal entity. The first and second IAM systems may be configured to initiate cross-border access requests based on access governance operations. The access governance operations may include reconciling inconsistent entitlements between a first set of entitlements from a first entitlement datastore associated with the first legal entity and a second set of entitlements from a second entitlement datastore associated with the second legal entity, synchronizing identity information between a first identity datastore associated with the first legal entity and a second identity datastore associated with the second legal entity, and/or evaluating the first set of entitlements from the first entitlement datastore for compliance with separation of duty (SoD) policies based on the second set of entitlements from the second entitlement datastore.

20 Claims, 5 Drawing Sheets

300

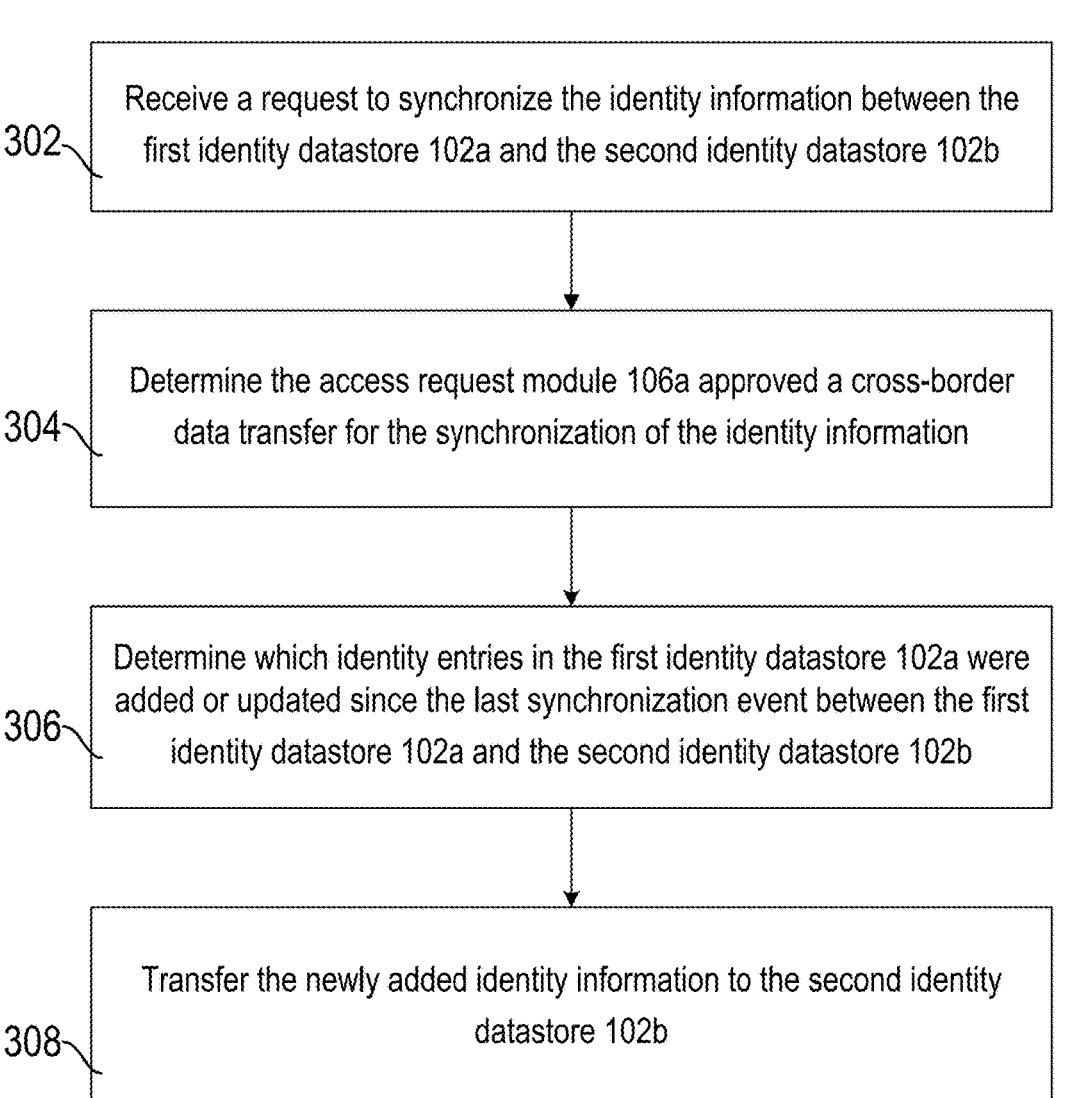

302 — Receive a request to synchronize the identity information between the first identity datastore 102a and the second identity datastore 102b 304 — Determine the access request module 106a approved a cross-border data transfer for the synchronization of the identity information 306 — Determine which identity entries in the first identity datastore 102a were added or updated since the last synchronization event between the first identity datastore 102a and the second identity datastore 102b 308 — Transfer the newly added identity information to the second identity datastore 102b

*FIG. 3*

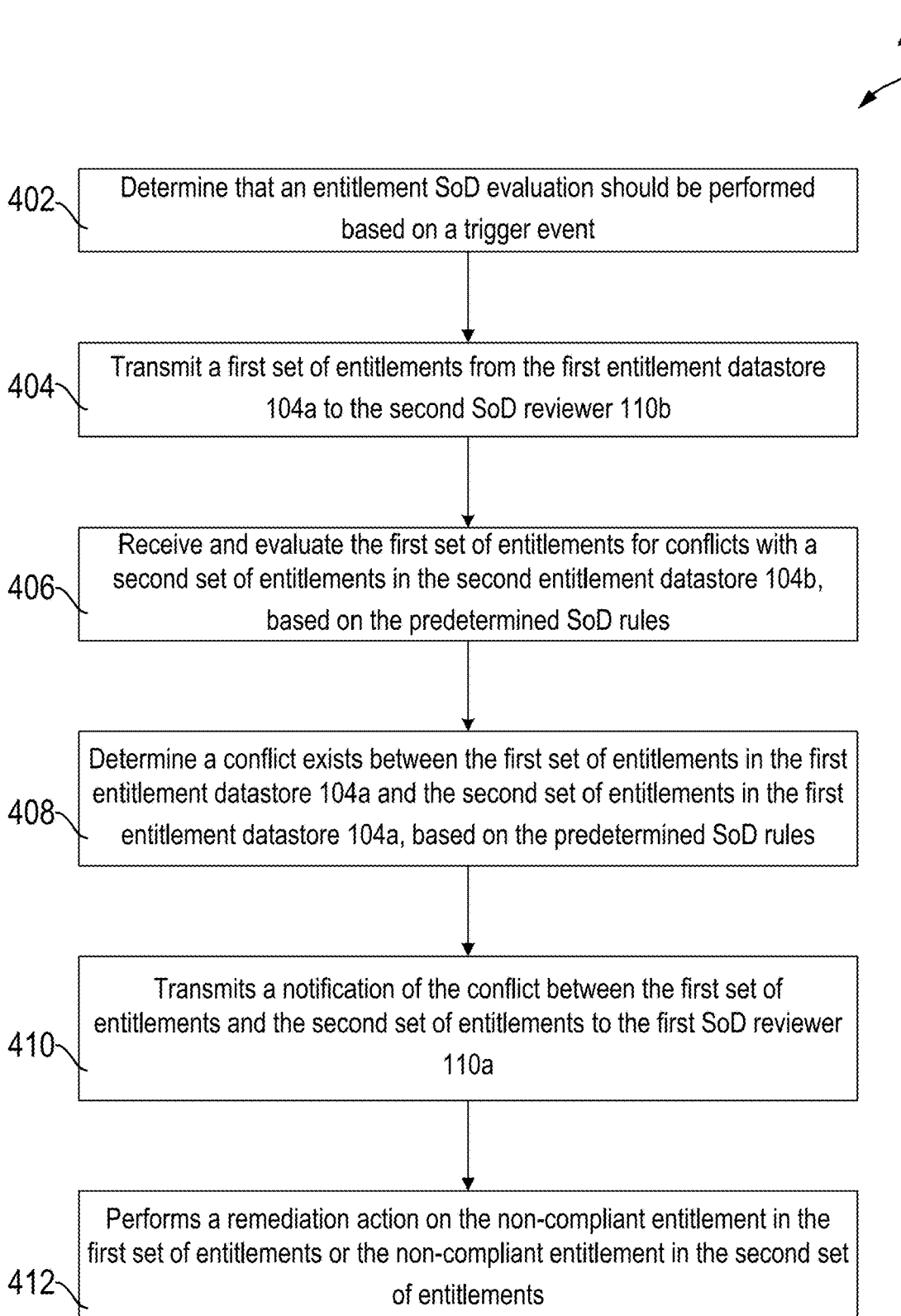

400

402 — Determine that an entitlement SoD evaluation should be performed based on a trigger event 404 — Transmit a first set of entitlements from the first entitlement datastore 104a to the second SoD reviewer 110b 406 — Receive and evaluate the first set of entitlements for conflicts with a second set of entitlements in the second entitlement datastore 104b, based on the predetermined SoD rules 408 — Determine a conflict exists between the first set of entitlements in the first entitlement datastore 104a and the second set of entitlements in the first entitlement datastore 104a, based on the predetermined SoD rules 410 — Transmits a notification of the conflict between the first set of entitlements and the second set of entitlements to the first SoD reviewer 110a 412 — Performs a remediation action on the non-compliant entitlement in the first set of entitlements or the non-compliant entitlement in the second set of entitlements

*FIG. 4*

SYSTEM AND METHOD FOR UNIFIED ACCESS MANAGEMENT FOR FEDERATED TECHNOLOGY INFRASTRUCTURE

BACKGROUND

The subject matter described herein relates to segregated data environments for global corporations. In today's business world, global enterprises and corporations are often structured as multiple legal entities in different geographical jurisdictions. These legal entities can operate in parent-child relationships or federation relationships to simplify data governance, reduce legal risk, and ensure regulatory compliance. The different legal entities within the global enterprise are structured as separate IT environment for each legal entity, which segregates data stored in different systems. The use of segregated IT environments may be necessary from legal and regulatory compliance standpoints but imposes significant challenges for managing computational, cross-entity access and identity operations across different legal entities. These challenges include managing access to systems and data across segregated environments, which existing identity and access management (IAM) solutions are not well equipped to handle.

For example, various data protection regulations and laws (e.g., United States and California for California Consumer Protection Act (CCPA), European Union for General Data Protection Regulation (GDPR), China for Personal Information Protection Law (PIPL), Brazil for General Personal Data Protection Act/Lei Geral de Proteção de Dados (LGPD)) restrict cross-border transfers of personal data. These laws often require enterprise data and personal data be kept within the country (e.g., data localization), and require the use of special transfer mechanisms (e.g., Standard Contractual Clauses, Adequacy Decisions) for cross-border transfers. Due to the variation of data protection rights by jurisdictions, the use of localized data management can simplify data management for IT administrators and ensure their practices comply with local regulatory requirements. To avoid legal risk, many global enterprises store and process their enterprise data locally, within a geographic jurisdiction, rather than transferring the data across borders to foreign jurisdictions.

Although this segregated data structure can greatly simplify data governance and ensure regulatory compliance, it also creates many challenges for data management across different geographic jurisdictions. For example, the IT administrators face difficulties in data integration, consistency, and data analytics because they need to manage redundant or portioned sets of data across the segregated data systems. Additionally, some regulatory policies require IT administrators to delete, rectify, or grant access to personal data upon user request, and to notify the regulators and the individual users if the data management system experiences a data breach. These policies inevitably create data inconsistencies as data is updated locally, and cannot be easily resolved due to limitations on cross-border data transfers. This requires IT administrators to implement data residency controls, encryption, and transfer mechanisms (e.g., Standard Contractual Clauses or Binding Corporate Rules) in order to comply with these data regulations.

While data segregation practices ensure compliance with regulations and reduce legal risk, these practices are often inefficient from a business perspective and result in the duplication of data processing which wastes time, money, and computational resources. Furthermore, the existing access management processes and systems, within global corporations, are ill-equipped to efficiently manage segregated data environments and still comply with data regulations. The present invention seeks to avoid the pitfalls associated with different geographic and jurisdictional compliance requirements, while efficiently managing segregated data environments in different legal entities through a unified access management system.

SUMMARY

In one general aspect, the present invention is directed to computer-implemented systems and methods for managing identity and access management (IAM) data across federated legal entities operating in separate geographic jurisdictions. A first IAM system, associated with a first legal entity, can initiate a cross-border access request with a second IAM system associated with a second legal entity. The cross-border access request can be initiated in response to a trigger event for an access governance operation, such as assigning entitlements to a user, synchronizing identity records, or performing SoD conflict checks. The first IAM system evaluates the request according to local access control policies, transmits the request to the second IAM system, and receives a response indicating whether the request is approved based on policies of the second legal entity.

If both systems approve, the first IAM system proceeds to execute the access governance operation.

Embodiments of the present invention can support specific types of access governance operations, such as identity synchronization, entitlement mapping reconciliation, and separation-of-duties (SoD) compliance analysis. Also, policy-based decisioning can be employed, using local access control policies, logging and status tracking for auditability. Additionally, trigger conditions such as user requests or periodic synchronization events can be utilized. The systems and methods can utilize integration with APIs, modular reviewer components, and batched processing for cross-entity entitlement comparisons.

Embodiments of the invention can provide several technical benefits. It enables cross-border access control decisions to be coordinated without transferring sensitive data unless approvals are obtained under local jurisdictional rules, thereby supporting compliance with global privacy laws (e.g., GDPR, CCPA, PIPL). It reduces the complexity of managing segregated IT environments, minimizing redundant operations and improving data consistency across IAM systems. It also improves security and auditability by ensuring that access governance decisions are made jointly, logged across systems, and executed only upon dual approval. This architecture allows multinational enterprises to unify access management while maintaining regulatory boundaries and operational autonomy for each legal entity. These and other benefits that can be realized through embodiments of the present invention will be apparent from the description that follows.

BRIEF DESCRIPTION OF THE DRAWINGS

Various embodiments of the present invention are described herein by way of example in conjunction with the following figures.

FIG. 3 shows a logic flow diagram for synchronizing identity information between a first identity datastore of a first legal entity and a second identity datastore of a second legal entity, according to various aspects of the present invention.

FIG. 4 shows a logic flow diagram for evaluating a first set of entitlements in the first entitlement database and/or a second set of entitlements in the second entitlement database, with respect to predetermined separation of duty rules, according to various embodiments of the present invention.

DETAILED DESCRIPTION

The present invention describes a unified access management system configured to manage federated technology infrastructure across different legal entities located in different geographical jurisdictions, that are part of the same corporate entity (e.g., global enterprise, company, corporation, or other business organization structure). The unified access management solutions, seeks to improve the business communication between legal entities in federated systems and conform to data segregation compliance requirement between IT assets (e.g., local data storage servers in different geographical jurisdiction). This data structure greatly reduces the risk of regulatory non-compliance, legal data privacy litigation, and cyber security risks, when companies have multiple entities in different geographic jurisdictions.

Figure 1:
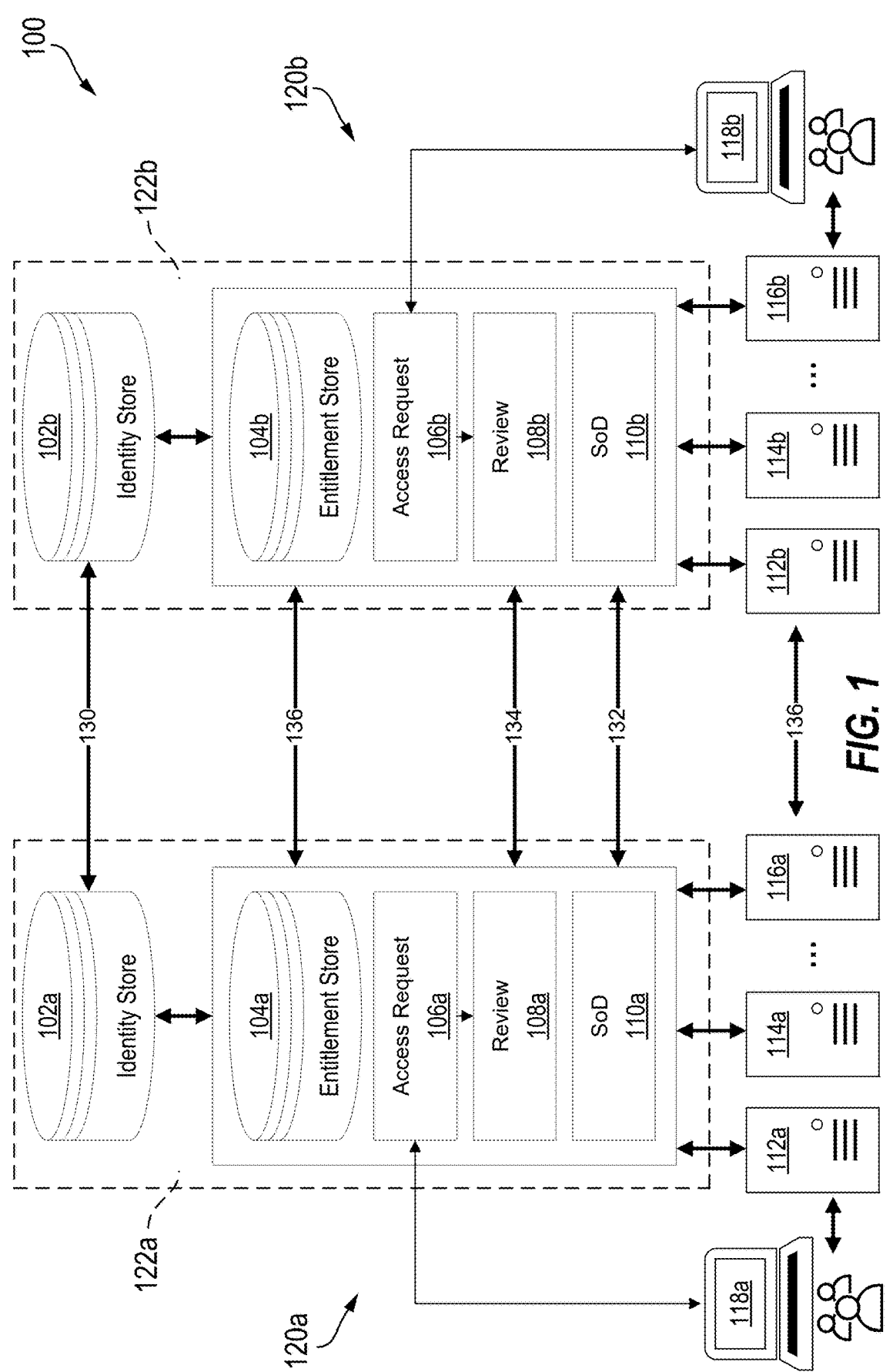
FIG. 1 shows a unified access management system comprising a first legal entity and a second legal entity, according to various embodiments of the present invention.

FIG. 1 shows a unified access management system 100 comprising a first legal entity 120*a* and a second legal entity 120*b*, according to various embodiments of the present invention. Each of the legal entities comprise an identity and access management (IAM) system 122 (first IAM system 122*a*, second IAM system 122*b*), communicably coupled to a plurality of applications (first set of applications 112*a*-116*a* hosted by the first legal entity, second set of applications 112*b*-116*b* hosted by the second legal entity). The IAM system 122 may be configured to manage entitlements, access, and permissions for users (first legal entity users 118*a*, second legal entity users 118*b*) for the plurality of applications. Each of the IAM systems 122*a*, 122*b* may comprise a plurality of datastores and modules including an identity datastore 102 (first identity datastore 102*a*, second identity datastore 102*b*), an entitlement datastore 104 (first entitlement datastore 104*a*, second entitlement datastore 104*b*), access request module 106 (first access request module 106*a*, second access request module 106*b*), reviewer module 108 (first reviewer module 108*a*, second reviewer module 108*b*), and a separation of duties (SoD) reviewer module 110 (first SoD reviewer module 110*a*, second reviewer module 110*b*). The identity datastore 102 is configured to store identity information for each user associated with a respective legal entity.

The entitlements datastore 104 is configured to store entitlements, permissions, or entitlement profiles (collectively referred to herein as "entitlements") which define one or more permissions or access rights associated with a user, group, or entity in relation to at least one business or system function. An entitlement can generally be defined (but without limitation) as some combination of access rights to a resource and accompanying actions to the relevant resource, and in some instances with additional coverage rules or restrictions that can be applied to these entitlements. A combination of a resource(s) and corresponding action(s)

on that resource(s) can be classified or grouped together as an 'activity' that may in turn be grouped into broader entitlements or groupings, such as 'roles' or 'profiles' with other activities, resources, actions, and/or coverages. Entitlements are stored in the entitlement store with the designated user, group, or entity in relation to at least one business or system function.

The IAM system 122 is a management platform configured to manage credentials, identity information, permissions, and access rights for users, groups, and system in an enterprise network. The IAM system comprises policies, technologies, and processes that allow the organization (e.g., global corporation) to manage digital identities and control access rights for resources (e.g., applications, license, roles) within the enterprise network. The IAM system 122 may be configured, through a plurality of management operations, to onboard new credentials, permissions, and/or access rights; manage users, groups, and/or system credentials; assign roles and responsibilities; authorize identity information; verifies compliance with laws, regulations, and internal policies; manage new and existing policies for identity and access information; and manage SoD policies. Access control policies may be implemented using policy-based access control (PBAC), role-based access control (RBAC), or attribute-based access control (ABAC) models. Policies may be evaluated using rules engines, access matrices, or declarative policy languages such as XACML or proprietary policy engines. The IAM system 122 comprises one or more computational resources in a server system such as a plurality of servers configured in a local datacenter (e.g., on-premise) or distributed server system (e.g., cloud system). The IAM systems 122 is configured to host and control the access request module 106*a*, 106*b*, the reviewer module 108*a*, 108*b*, and the SoD module 110*a*, 110*b*, through the server systems.

In various aspects, the unified access management system 100 may comprise two or more legal entities where each of the plurality legal entities 120 are located in different geographic jurisdictions. The global corporation may establish separate legal entities for a variety of reasons such as ensuring compliance with different data regulations or reducing legal risk associated with data privacy laws. In this segregated data structure, the first legal entity 120*a* and the second legal entity 120*b* are part of the same enterprise system but operate as independently distinct IT environments. The global corporation may have their main corporate offices in a first geographic location that is governed by a first set of data protection and privacy laws (e.g., GDPR, CCPA, PIPL) while a second set of offices are in a second geographic location that is governed by a second set of data protection and privacy laws. In one example, the first legal entity 120*a* is a local system in a first geographical jurisdiction (e.g., China, Brazil, or other geographic jurisdiction for a local legal entity) and the second legal entity 120*b* is a global system in a second geographical jurisdiction (e.g., E.U., U.S., or other main geographic jurisdiction for the global legal entity).

Thus, in order to separately maintain segregated data systems in a first IAM system 122*a* and a second IAM system 122*b*, the global corporation must incur increased infrastructure and data costs to maintain these systems. These systems require separate cloud regions, datacenters, or virtual networks. Furthermore, these systems require additional IT staff to maintain regional support, legal interpretation, and monitoring. However, unified access management system 100 of the present invention streamlines this process through management operations performed by the IAM systems of each legal entity.

The first legal entity 120a and the second legal entity 120b may perform a plurality of data management operations to manage user identity information and entitlements stored in the segregated IAM systems 122a, 122b. Prior to performing one of the plurality of data management operations, the legal entities must be approved to engage in cross-border data integration. For example, the first IAM system 122a in the first legal entity 120a may initiate management operation that triggers a cross-border data transfer request 134 through an application program interface (API) call. Once the cross-border data transfer request is approved, the first IAM system 122a and the second IAM system 122b may perform one of the data management operations, such as synchronizing user identity information between the identity data-stores 102a, 102b (i.e., identity federation process 130); verifying separation of duty compliance between the entitlement datastores 104a, 104b (i.e., entitlement SoD process 132); or synchronizing entitlements model and mapping between the entitlement datastores 104a, 104b (i.e., entitlement reconciliation process 136).

In various embodiments, the first and second IAM systems may be implemented in separate physical infrastructures or logically segregated environments within a shared infrastructure, such as a multi-tenant cloud platform. The systems may interoperate using standardized APIs, secure communication protocols (e.g., HTTPS, OAuth), and may translate identity or entitlement formats via schema mapping techniques.

Figure 2:
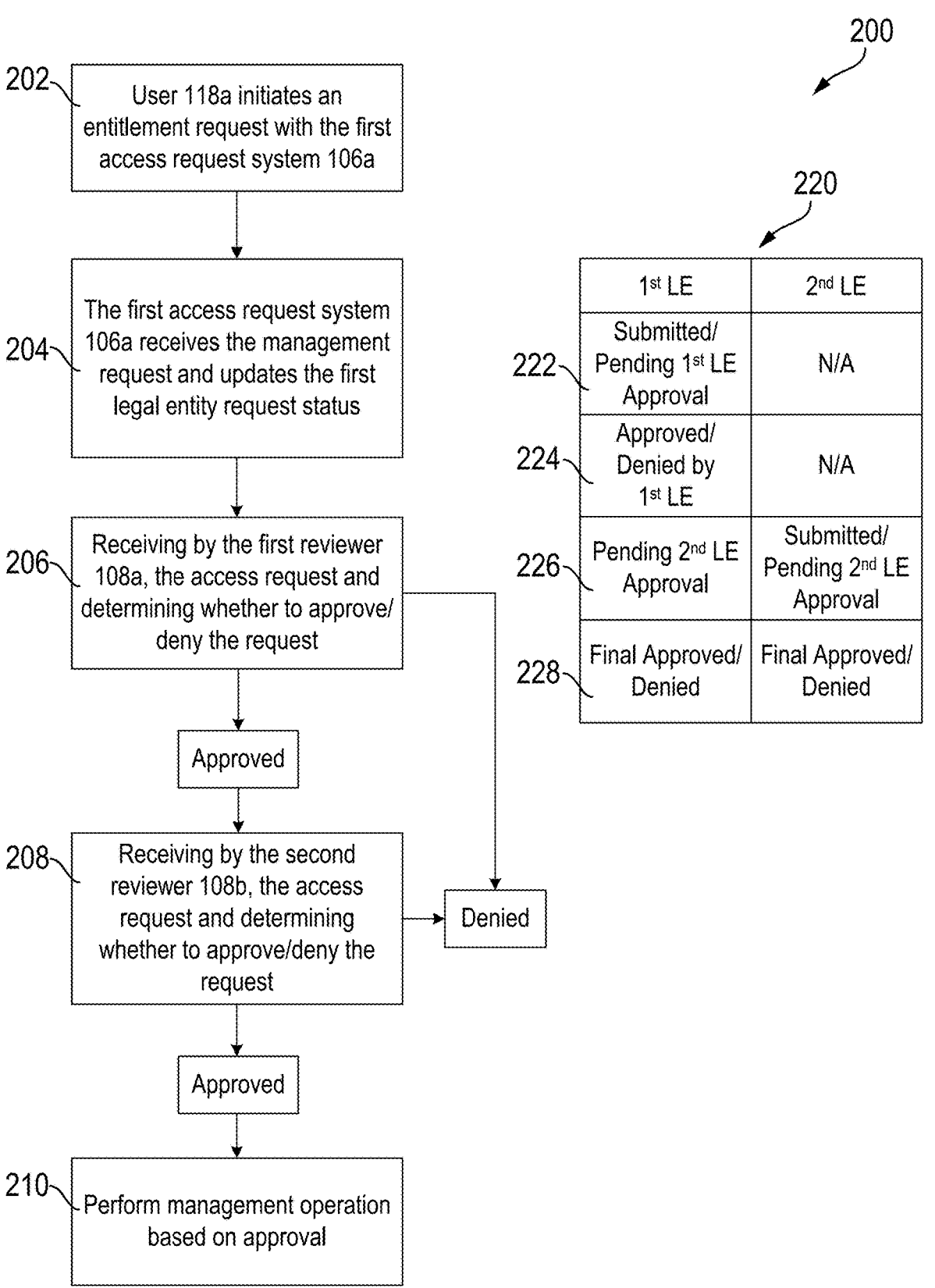
FIG. 2 shows a logic flow diagram for approving a cross-border data transfer, according to various embodiments of the present invention.

FIG. 2 shows a logic flow diagram 200 for approving a cross-border data transfer, according to various embodiments of the present invention. A cross-border data transfer request 134 may be initiated by any of the plurality of IAM systems 122 in the unified access management system 100. In one example, the first IAM system 122a is a local legal entity and would like to perform a data management operation (e.g., identity federation, SoD review, reconcile datastore inconsistencies). In order to perform a data management operation with another legal entity 120, the first IAM system 122a must receive approval for a cross-border data transfer 134. The first IAM system 122a may initiate a cross-border data transfer request 134 in response to an entitlement request, user information request, or another data management operation.

FIG. 2 shows a cross-border data transfer approval process 200, originating in the first legal entity 120a, according to various embodiments of the present invention. Although the approval process 200 is shown from the perspective of the first legal entity 120a, an approval process may originate from the second legal entity 120b in which case the roles of the first legal entity 120a and the second legal entity 120b would be reversed. In this example, a user 118a of the first legal entity 120a initiates, at 202, an access request (e.g., entitlement request) with the access request system 106a of the first IAM system 122a. The user 118a of the first legal entity 120a requests entitlement access (e.g., Ent1_1$^{st}$LE) to a first application 112a.

The access request service 106a receives, at 204, the access request and initiates the approval process through an application program interface (API) call with the second IAM system 122b of the second legal entity 120b. The access request service 106a may be configured to set an initial request status 222, shown in the status table 220, to Submitted/Pending approval by the first legal entity 120a. The status table 220 is a visual representation of the request approval status at each of the legal entities.

The first reviewer 108a on the first IAM system 122a receives, at 206, the access request, and determines whether the access request is approved or denied. If the first reviewer 108a approves the access request, the access request is forwarded to the second reviewer 108b in the second legal entity 120b. If the first reviewer 108a denies the access request, the approval process ends and the access request is not sent to the second reviewer 108b. The first reviewer 108b updates the access request status 224 to either pending approval by the second legal entity 120b or denied.

The second reviewer 108b receives, at 208, the access request from the first reviewer 108a and determines whether the request is approved or denied based on a predefined approval process for the second IAM system 122b. The second reviewer 108b updates the access request status 226 to pending approval by the second legal entity 120b. If the second reviewer 108b determines that the access request is approved, the access request status 228 is updated to final approved or final denied. After receiving a final approval by second IAM system 122b on the second legal entity 120b, the first IAM system 122b on the first legal entity 120a may perform, at 210, the management operation, such as initiating the entitlement reconciliation process 136.

As previously discussed, another one of plurality of management operations includes synchronizing the identity datastore 102 through the identity federation process 130. Due to data segregation practices, local updates to the first identity stores 102a are not reflect in the second identity data store 102b. Similarly, local updates to the second identity stores 102b are not reflected in the first identity data store 102a. The identity federation process 130 synchronizes inconsistent identity information between the first IAM system 122a and the second IAM system 122b. For example, an identity federation process 130 is initiated by an asset or trigger event (e.g., user request, admin policy) in the first legal entity 120a. The identity federation process 130 causes the initiating IAM system to identify user identity information (e.g., new, updated, or all identity information), stored in the first identity store 102a of the first legal entity 120a, to be pushed to the second identity store 102a of the second legal entity 120b. This allows the second legal entity 120b to gain access to the user identity information located in the first legal entity 120a. If there was new user identity information added to the first identity store 102a in the first legal entity 120a, this information would not be accessible by the second legal entity 120b until the identity federation process was initiated by the first legal entity 120a. A system for identity federation is described in Application No. U.S. Ser. No. 18/736,043, titled "UNIFIED IDENTITY AND ACCESS MANAGEMENT SOLUTION FOR FEDERATED LEGAL ENTITIES WITH HYBRID CLOUD INFRASTRUCTURE", which is incorporated by reference in its entirety.

FIG. 3 shows a logic flow diagram 300 for synchronizing identity information between a first identity datastore 102a of a first legal entity 120a and a second identity datastore 102b of a second legal entity 120b, according to various aspects of the present invention. The first IAM system 122a receives, at 302, a request to synchronize the identity information between the first identity datastore 102a and the second identity datastore 102b. In various aspects, the request may be based on a user 118a request or based on a policy trigger such as a predetermined event (e.g., an update or newly added batch of identity information) or a predetermined policy such as duration since the last synchronization event (e.g., daily or weekly synchronization between identity datastores). The first IAM system 122a determines, at 304, the access request modules (both 106*a* and 106*b*) approved a cross-border data transfer for the synchronization of the identity information. If a cross-border data transfer is not yet approved, the IAM system must receive approval before the synchronization of identity data can be performed, as shown in FIG. 2. The first IAM system 122*a* determines, at 306, which identity entries in the first identity datastore 102*a* were added or updated since the last synchronization event between the first identity datastore 102*a* and the second identity datastore 102*b*. The first IAM system 122*a* transfers, at 308, the newly added identity information to the second identity datastore 102*b*.

Another management operation includes evaluating newly added entitlements, in the first legal entity, with the entitlements of the second legal entity, based on the separation of duties (SoD) policies. Assuming the first IAM system 122*a* and the second IAM system 122*b* have previously performed an SOD analysis event 132 for cross-border entitlements, the first IAM system 122*b* transmits newly added cross-border users' entitlements from the first entitlement datastore 104*a* to the second legal entity 120*b*, for a separation of duties (SoD) evaluation/analysis. Although the SoD evaluation may be performed from the perspective of the first legal entity 120*a* or the second legal entity 120*b*, this evaluation may be performed for both the first legal entity 120*a* and the second legal entity 120*b*, so that SoD conflicts can be detected for all cross-border entitlements from both sides (e.g., two-way verification of compliance, allowing both system to detect and rectify potential conflicts). The SoD analysis may be performed as a batch job by transmitting a copy of entitlements from the first entitlement datastore 104*a* to the second entitlement datastore 104*b*, and similarly from the second entitlement datastore 104*b* to the first entitlement datastore 104*a*.

In general, the SoD reviewer 110 of the IAM systems 122 performs the SoD analysis to verify that users or groups do not hold entitlements (e.g., access rights or permissions) that violate a predetermined separation of duty (SoD) rule. The underlying basis for the predetermined SoD rules may be data privacy, data security, fraud prevention, regulatory compliance, or error prevention. In one example, the SoD system includes specific SoD rule that prevents users or groups from holding entitlements for both a maker role and a checker role. A maker may be tasked with initiating or preparing a transaction (e.g., creating wire transfer, initiating payment, entering account entries, preparing loon documents, preparing financial reports) while a checker may be responsible for reviewing, verifying, or approving the transaction prepared by the maker. Specifically, the checker is tasked with checking the prepared transaction for errors, fraud, and compliance (e.g., regulatory and internal compliance), and approving the transaction. Thus, the IAM system 122 may include a SoD policy that prohibits a user from holding an entitlement role for both a maker and a checker because there is an inherent conflict detecting or determining errors, fraud, or compliance. A system for ensuring compliance with predetermined SoD rules is described in Application No. U.S. Ser. No. 19/190,115, titled "CENTRALIZED TECHNOLOGY ACCESS CONTROL", which is incorporated by reference in its entirety.

FIG. 4 shows a logic flow diagram 400 for evaluating a first set of entitlements in the first entitlement database 104*a* and/or a second set of entitlements in the second entitlement database 104*b*, with respect to predetermined SoD rules, according to various embodiments of the present invention. The first IAM system 122*a* or the second IAM system 122*b* determines, at 402, that an entitlement SoD evaluation should be performed based on a trigger event. The entitlement SoD evaluation determines that any new entitlement models or updated entitlement models do not create conflicts and are in compliance with the predetermined SoD rules. For example, the first SoD reviewer 110*a* of the first IAM system 122*a* transmits, at 404, a first set of entitlements from the first entitlement datastore 104*a* to the second SoD reviewer 110*b*. The first set of entitlements may include an updated entitlement or a newly added entitlement in the first entitlement datastore 104*a* that resulted in the trigger event. The second SoD reviewer 110*b* of the second IAM system 122*a* receives and evaluates, at 406, the first set of entitlements for conflicts with a second set of entitlements in the second entitlement datastore 104*b*, based on the predetermined SoD rules. Additionally, the second SoD reviewer 110*b* may respond to the first SoD reviewer 110*a* with the second set of entitlements, allowing the first SoD reviewer 110*a* to verify the second set of entitlements with the predetermined SoD rules. The second SoD reviewer 110*b* may provide the response based on an updated or new entitlement in the second set of entitlements. The second SoD reviewer 110*b* determines, at 408, a conflict exists between the first set of entitlements in the first entitlement datastore 104*a* and the second set of entitlements in the second entitlement datastore 104*b*, based on the predetermined SoD rules. The second SoD reviewer 110*b* transmits, at 410, a notification of the conflict between the first set of entitlements and the second set of entitlements to the first SoD reviewer 110*a*. In response to receiving the notification of the conflict, the first SoD reviewer 110*a* performs, at 412, a remediation action. The notification may indicate the specific non-compliant entitlement in the first set of entitlements, the affected rule of the predetermined SoD rules, and the corresponding entitlement in the second set of entitlements. This information may be used to determine the remediation action, such as automatically reverting to the prior compliant entitlement, or seeking approval to temporarily override the affected SoD rule.

Figure 5:
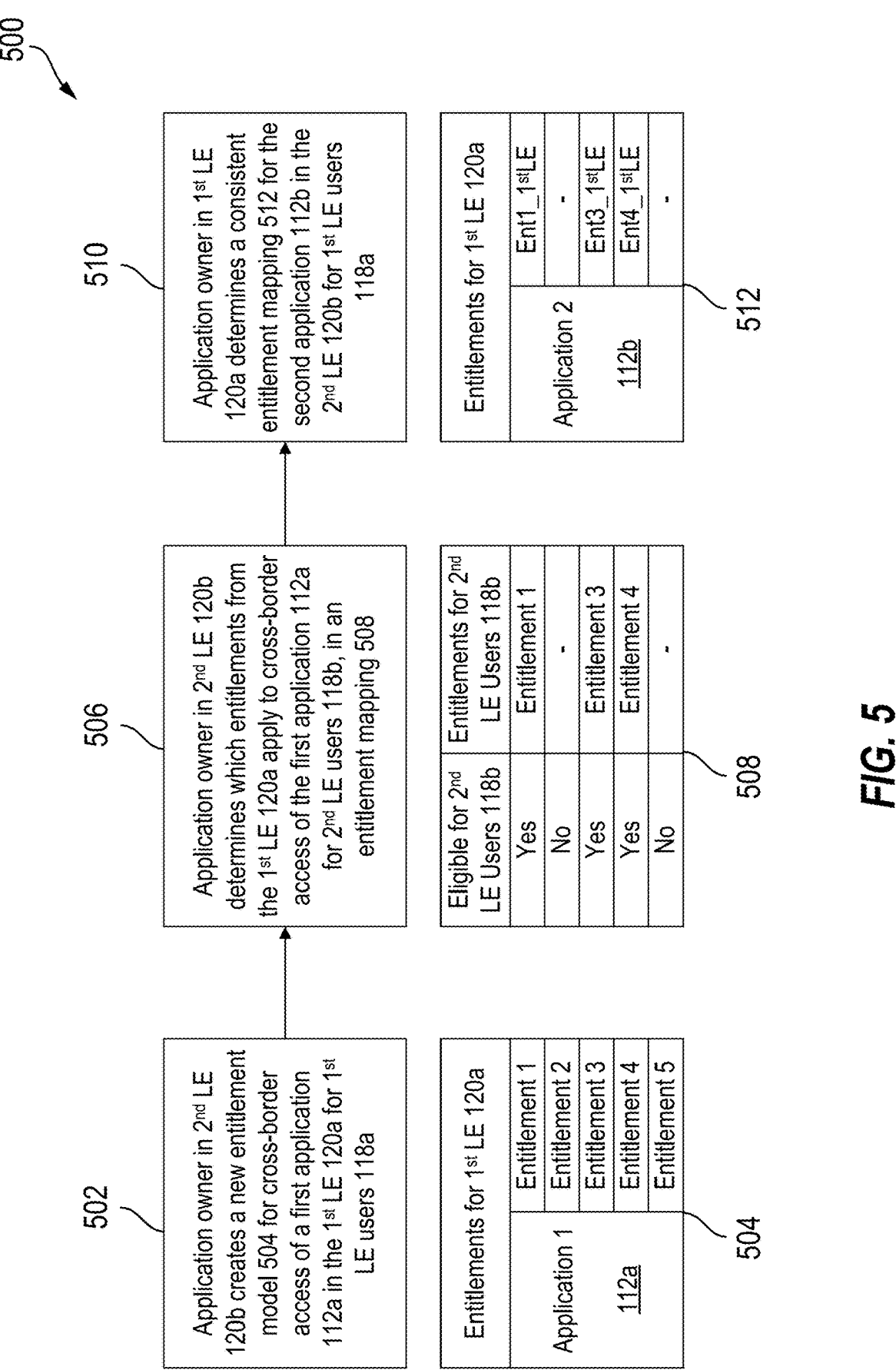
FIG. 5 shows a logic flow diagram for performing a reconciliation process for entitlement definitions and entitlement onboarding, according to various embodiments of the present invention.

FIG. 5 shows a logic flow diagram 500 for performing a reconciliation process 136 for entitlement definitions and entitlement onboarding, according to various embodiments of the present invention. The entitlement definitions and entitlement onboarding define the entitlement model and mapping between the first legal entity 120*a* and the second legal entity 120*b*. The reconciliation process 136 ensures that the entitlement models and mapping are consistent between the first entitlement datastore 104*a* and the second entitlement datastore 104*b*. For example, a first application 112*a* is available to users 118*a* in the first legal entity 120*a*, and can be a replica of a second application 112*b* that is available to users 118*b* on the second legal entity 120*b*. An application owner in the second legal entity 120*b* creates, at 502, a new entitlement model 504 for cross-border access of a first application 112*a* by users 118*a* in the first legal entity 120*a*. The application owner in the second legal entity 120*b* determines, at 506, which of the newly created entitlement model 504 for the first application 112*a* apply to users 118*b* of the second legal entity 120*b* for cross-board assess of the first application 112*a*. The application owner in the second legal entity 120*b* determines a new entitlement mapping 508 for cross-border access by users of the second legal entity 118*b* for the first application 112*b*.

A first application owner in the first legal entity 120*a*, determines, at 510, that the new entitlement model 504 was created for users 118*b* in the second legal entity 120*b*. The first application owner in the first legal entity 120*a* initiates an entitlement datastore reconciliation process 136 as a batch job, based on an indication of an updated or new entitlement model in the second legal entity 120*b*. The reconciliation process 136 ensures that the entitlements model and entitlement mappings are consistent between the first legal entity 120*a* and the second legal entity 120*b*. The first application owner in the first legal entity 120*a* determines a consistent entitlement mapping 512 for cross-border access by users 118*a* of the first legal entity for a second application 112*b*. The consistent entitlement mapping 512 ensures that users in both the first legal entity and the second legal entity hold the same permissions and access levels.

Although the unified access management system may support multiple access governance operations, in some embodiments, only a subset of such operations (e.g., identity synchronization without entitlement reconciliation) may be implemented.

In one general aspect, therefore, the present invention is directed to a method for managing IAM data in a segregated data structure. The method comprises, according to various embodiments, the step of initiating, by a first IAM system, a cross-border access request with a second IAM system, where the first IAM system is associated with a first legal entity in a first geographic jurisdiction and the second IAM system is associated with a second legal entity in a second geographic jurisdiction, and where the cross-border access request is initiated based on a trigger event for an access governance operation originating in the first legal entity. The method also includes the step of making, by the first IAM system, a determination of whether to approve or deny the cross-border access request with the second IAM system, where the determination is based on one or more access control policies of the first legal entity. The method also includes the step of transmitting, by the first IAM system, the cross-border access request to the second IAM system in response to determining the cross-border access request is approved by the first IAM system. The method also includes the step of receiving, by the first IAM system, a response from the second IAM system, the response indicating whether the cross-border access request is approved by the second IAM system based on the one or more access control policies of the second legal entity. And the method comprises the step of executing, by the first IAM system, the access governance operation in response to determining that a final approval status indicates approval of the cross-border access request by both the first and second IAM systems.

According to various implementations, the method further comprises the step of receiving, by the first IAM system, an access governance request to perform the access governance operation associated with the second IAM system, where the trigger event for the access governance operation is the access governance request initiated by a first legal entity user.

According to various implementations, the method further comprises the step of receiving, by the first IAM system, an access governance request to perform the access governance operation associated with the second IAM system, where the trigger event for the access governance operation is based on the one or more access control policies. The one or more access control policies can comprises any one of: an updated entitlement, a new entitlement model, or expiration of a predetermined synchronization interval.

In various implementations, the first geographic jurisdiction is subject to a first data privacy regulation and is not subject to a second data privacy regulation. And the second geographic jurisdiction is subject to the second data privacy regulation and is not subject to the first data privacy regulation.

In various implementations, the first geographic jurisdiction is subject to a first data privacy regulation that is GDPR or CCPA. And the second geographic jurisdiction is subject to a second data privacy regulation, wherein the second data privacy regulation is different than the first data privacy regulation.

In various implementations, the second geographic jurisdiction is subject to a first data privacy regulation that is GDPR or CCPA; and the first geographic jurisdiction is subject to a second data privacy regulation, wherein the second data privacy regulation is different than the first data privacy regulation.

In various implementations, the method further comprises the steps of: receiving, by the first IAM system, the access governance request to perform the access governance operation associated with the second IAM system, wherein the access governance operation comprises synchronizing identity information between the first IAM system and the second IAM system; determining, by the first IAM system, the final approval status of the cross-border access request is approved by both the first legal entity and the second legal entity; determining, by the first IAM system, new identity information is added to a first identity datastore after a prior synchronization between the first identity datastore and a second identity datastore, where the first identity datastore is associated with the first legal entity and the second identity datastore is associated with the second legal entity; and transferring, by the first IAM system, the new identity information to the second IAM system.

In various implementations, the method further comprises the steps of: receiving, by the first IAM system, the access governance request to perform the access governance operation associated with the second IAM system, where the access governance operation comprises verifying entitlement compliance with SoD policies for a first entitlement datastore of the first IAM system and a second entitlement datastore of the second IAM system, wherein the first entitlement datastore is associated with the first legal entity and the second entitlement datastore is associated with the second legal entity; determining, by the first IAM system, the final approval status of the cross-border access request is approved by both the first legal entity and the second legal entity; transmitting, by a first SoD reviewer of the first IAM system, a first set of entitlements from the first entitlement datastore to a second SoD reviewer of the second IAM system, where the second SoD reviewer is configured to evaluate the first set of entitlements for conflicts with a second set of entitlements in the second entitlement datastore, based on predetermined SoD rules; receiving, by the first SoD reviewer, a notification of a conflict between the first set of entitlements and the second set of entitlements to the first SoD reviewer; and performing, by the first SoD reviewer, a remediation action based on the notification of the conflict between the first set of entitlements and the second set of entitlements. In various embodiments, the notification indicates a non-compliant entitlement in the first set of entitlements and a conflict rule of the predetermined SoD rules. Also, the remediation action can be based on the non-compliant entitlement in the first set of entitlements and the conflict rule of the predetermined SoD rules.

In various implementations, the method further comprises the steps of: creating, by a second application owner in the second IAM system, an entitlement model with a plurality of entitlements, where each of the plurality of entitlements in the entitlement model defines a role, permission, access level, or cross-border access for first legal entity users of a first legal entity application, and where the first legal entity application is hosted by the first legal entity; creating, by the second application owner, a second entitlement mapping for second legal entity users based on the entitlement model for the first legal entity application; receiving, by the first IAM system, the access governance request to perform the access governance operation associated with the second IAM system, where the access governance operation comprises reconciling the second entitlement mapping for the second legal entity users with a first entitlement mapping for the first legal entity users; creating, by a first application owner in the first legal entity, the first entitlement mapping for a second legal entity application by the first legal entity users based on the second entitlement mapping for the first legal entity application; and storing, by the first IAM system, the entitlement model, the first entitlement mapping, and the second entitlement mapping in a first entitlement datastore associated with the first legal entity.

In various implementations, the access governance operation comprises at least one of: reconciling, by the first IAM system, inconsistent entitlements between a first set of entitlements from a first entitlement datastore associated with the first legal entity and a second set of entitlements from a second entitlement datastore associated with the second legal entity; synchronizing, by the first IAM system, identity information between a first identity datastore associated with the first legal entity and a second identity datastore associated with the second legal entity; evaluating, by the first IAM system, the first set of entitlements from the first entitlement datastore for compliance with separation of duty (SoD) policies based on the second set of entitlements from the second entitlement datastore; or a combination thereof.

In another general aspect, the present invention is directed to a system for managing identity and access entitlements. According to various embodiments, the system comprises an enterprise network associated with a business entity, where the business entity comprises a first legal entity and a second legal entity. The first legal entity comprises a first IAM system comprising a first identity datastore and a first entitlement datastore, and a first plurality of applications communicably coupled with the first IAM system. The second legal entity comprises a second IAM system comprising a second identity datastore and a second entitlement datastore, and a second plurality of applications communicably coupled with the second IAM system. The first legal entity is associated with a first geographic jurisdiction and the second legal entity is associated with a second geographic jurisdiction. The first IAM system is in communication with the second IAM system. And the first IAM system is configured to: initiate a cross-border access request with the second IAM system, and where the cross-border access request is initiated based on a request to perform an access governance operation originating in the first legal entity; make a determination of whether to approve or deny the cross-border access request with the second IAM system, where the determination is based on one or more access control policies of the first legal entity; transmit the cross-border access request to the second IAM system in response to determining the cross-border access request is approved by the first IAM system, wherein the second IAM system determines whether to approve or deny the cross-border access request; receive a response from the second IAM system, the response indicating whether the cross-border access request is approved by the second IAM system based on the one or more access control policies of the second legal entity; and execute the access governance operation in response to determining that a final approval status indicates approval of the cross-border access request by both the first and second IAM systems.

According to various implementations, the first IAM system and the second IAM system manage segregated data environments between the first legal entity and the second legal entity, where the first identity datastore and the first entitlement datastore are segregated from the second identity datastore and the second entitlement datastore.

According to various implementations, the first IAM system is further configured to: receive the request to perform the access governance operation associated with the second IAM system, where the access governance operation comprises synchronizing identity information between the first IAM system and the second IAM system; determine the final approval status of the cross-border access request is approved by both the first legal entity and the second legal entity; determine new identity information is added to the first identity datastore after a prior synchronization between the first identity datastore and the second identity datastore; and transfer the new identity information to the second IAM system.

According to various implementations, the first IAM system is further configured to: receive the request to perform the access governance operation associated with the second IAM system, where the access governance operation comprises verifying entitlement compliance with separation of duty (SoD) policies for the first entitlement datastore of the first IAM system and the second entitlement datastore of the second IAM system; determine the final approval status of the cross-border access request is approved by both the first legal entity and the second legal entity; transmit a first set of entitlements from the first entitlement datastore to a second SoD reviewer of the second IAM system, where the second SoD reviewer is configured to evaluate the first set of entitlements for conflicts with a second set of entitlements in the second entitlement datastore, based on predetermined SoD rules; receive a notification of a conflict between the first set of entitlements and the second set of entitlements; and perform a remediation action based on the notification of the conflict between the first set of entitlements and the second set of entitlements.

According to various implementations, the second IAM system is configured to: create an entitlement model with a plurality of entitlements, where each of the plurality of entitlements in the entitlement model defines a role, permission, access level, or cross-border access for first legal entity users of a first legal entity application, and wherein the first legal entity application is hosted by the first legal entity; create a second entitlement mapping for second legal entity users based on the entitlement model for the first legal entity application. Also, the first IAM system can be further configured to: receive the request to perform the access governance operation associated with the second IAM system, where the access governance operation comprises reconciling the second entitlement mapping for the second legal entity users with a first entitlement mapping for the first legal entity users; create the first entitlement mapping for a second legal entity application by the first legal entity users based on the second entitlement mapping for the first legal entity application; and store the first entitlement mapping, and the second entitlement mapping in the first entitlement datastore associated with the first legal entity.

According to various implementations, the request to perform the access governance operation is generated based on a predetermined policy for anyone of: an updated entitlement, a new entitlement model, or a predetermined duration since a last synchronization event.

According to various implementations, the first geographic jurisdiction is subject to a first data privacy regulation and is not subject to a second data privacy regulation; and the second geographic jurisdiction is subject to the second data privacy regulation and is not subject to the first data privacy regulation.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. Persons skilled in the art will appreciate that recited operations therein may generally be performed in any order. Also, although various operational flow diagrams are presented in a sequence(s), it should be understood that the various operations may be performed in other orders than those which are illustrated, or may be performed concurrently. The disclosed embodiments are therefore intended to include all such modifications, alterations, and adaptations without departing from the scope of the embodiments as set forth herein.

What is claimed is:

1. A method for managing identity and access management (IAM) data in a segregated data structure, the method comprising:

initiating, by a first IAM system, a cross-border access request with a second IAM system, wherein the first IAM system is associated with a first legal entity in a first geographic jurisdiction and the second IAM system is associated with a second legal entity in a second geographic jurisdiction, and wherein the cross-border access request is initiated based on a trigger event for an access governance operation originating in the first legal entity;

making, by the first IAM system, a determination of whether to approve or deny the cross-border access request with the second IAM system, wherein the determination is based on one or more access control policies of the first legal entity;

transmitting, by the first IAM system, the cross-border access request to the second IAM system in response to determining the cross-border access request is approved by the first IAM system;

receiving, by the first IAM system, a response from the second IAM system, the response indicating whether the cross-border access request is approved by the second IAM system based on the one or more access control policies of the second legal entity;

determining, by the first IAM system, that a final approval status for the cross-border access request is approved by both the first legal entity and the second legal entity; and executing, by the first IAM system, the access governance operation in response to determining that the final approval status indicates approval of the cross-border access request by both the first and second IAM systems.

2. The method of claim 1, further comprising receiving, by the first IAM system, an access governance request to perform the access governance operation associated with the second IAM system, wherein the trigger event for the access governance operation is the access governance request initiated by a first legal entity user.

3. The method of claim 1, further comprising receiving, by the first IAM system, an access governance request to perform the access governance operation associated with the second IAM system, wherein the trigger event for the access governance operation is based on the one or more access control policies.

4. The method of claim 3, wherein the one or more access control policies comprises any one of:

an updated entitlement, a new entitlement model, or expiration of a predetermined synchronization interval.

5. The method of claim 1, wherein:

the first geographic jurisdiction is subject to a first data privacy regulation and is not subject to a second data privacy regulation; and the second geographic jurisdiction is subject to the second data privacy regulation and is not subject to the first data privacy regulation.

6. The method of claim 1, wherein:

the first geographic jurisdiction is subject to a first data privacy regulation that is European Union for General Data Protection Regulation (GDPR) or California Consumer Protection Act (CCPA); and the second geographic jurisdiction is subject to a second data privacy regulation, wherein the second data privacy regulation is different than the first data privacy regulation.

7. The method of claim 1, wherein:

the second geographic jurisdiction is subject to a first data privacy regulation that is GDPR or CCPA; and the first geographic jurisdiction is subject to a second data privacy regulation, wherein the second data privacy regulation is different than the first data privacy regulation.

8. The method of claim 2, further comprising:

receiving, by the first IAM system, the access governance request to perform the access governance operation associated with the second IAM system, wherein the access governance operation comprises synchronizing identity information between the first IAM system and the second IAM system;

determining, by the first IAM system, new identity information is added to a first identity datastore after a prior synchronization between the first identity datastore and a second identity datastore, wherein the first identity datastore is associated with the first legal entity and the second identity datastore is associated with the second legal entity; and transferring, by the first IAM system, the new identity information to the second IAM system.

9. The method of claim 2, further comprising:

receiving, by the first IAM system, the access governance request to perform the access governance operation associated with the second IAM system, wherein the access governance operation comprises verifying entitlement compliance with segregation of duty (SoD) policies for a first entitlement datastore of the first IAM system and a second entitlement datastore of the second IAM system, wherein the first entitlement datastore is associated with the first legal entity and the second entitlement datastore is associated with the second legal entity;

transmitting, by a first SoD reviewer of the first IAM system, a first set of entitlements from the first entitlement datastore to a second SoD reviewer of the second IAM system, wherein the second SoD reviewer is configured to evaluate the first set of entitlements for conflicts with a second set of entitlements in the second entitlement datastore, based on predetermined SoD rules;

receiving, by the first SoD reviewer, a notification of a conflict between the first set of entitlements and the second set of entitlements to the first SoD reviewer; and performing, by the first SoD reviewer, a remediation action based on the notification of the conflict between the first set of entitlements and the second set of entitlements.

10. The method of claim 9, wherein the notification indicates a non-compliant entitlement in the first set of entitlements and a conflict rule of the predetermined SoD rules.

11. The method of claim 10, wherein the remediation action is based on the non-compliant entitlement in the first set of entitlements and the conflict rule of the predetermined SoD rules.

12. The method of claim 2, further comprising:

creating, by a second application owner in the second IAM system, an entitlement model with a plurality of entitlements, wherein each of the plurality of entitlements in the entitlement model defines a role, permission, access level, or cross-border access for first legal entity users of a first legal entity application, and wherein the first legal entity application is hosted by the first legal entity;

creating, by the second application owner, a second entitlement mapping for second legal entity users based on the entitlement model for the first legal entity application;

receiving, by the first IAM system, the access governance request to perform the access governance operation associated with the second IAM system, wherein the access governance operation comprises reconciling the second entitlement mapping for the second legal entity users with a first entitlement mapping for the first legal entity users;

creating, by a first application owner in the first legal entity, the first entitlement mapping for a second legal entity application by the first legal entity users based on the second entitlement mapping for the first legal entity application; and storing, by the first IAM system, the entitlement model, the first entitlement mapping, and the second entitlement mapping in a first entitlement datastore associated with the first legal entity.

13. The method of claim 1, wherein the access governance operation comprises at least one of:

reconciling, by the first IAM system, inconsistent entitlements between a first set of entitlements from a first entitlement datastore associated with the first legal entity and a second set of entitlements from a second entitlement datastore associated with the second legal entity;

synchronizing, by the first IAM system, identity information between a first identity datastore associated with the first legal entity and a second identity datastore associated with the second legal entity;

evaluating, by the first IAM system, the first set of entitlements from the first entitlement datastore for compliance with separation of duty (SoD) policies based on the second set of entitlements from the second entitlement datastore; or a combination thereof.

14. A system for managing identity and access entitlements comprising:

an enterprise network associated with a business entity, wherein the business entity comprises a first legal entity and a second legal entity;

the first legal entity comprising:

a first IAM system comprising a first identity datastore and a first entitlement datastore; and a first plurality of applications communicably coupled with the first IAM system;

the second legal entity comprising:

a second IAM system comprising a second identity datastore and a second entitlement datastore; and a second plurality of applications communicably coupled with the second IAM system;

the first legal entity is associated with a first geographic jurisdiction and the second legal entity is associated with a second geographic jurisdiction;

the first IAM system in communication with the second IAM system, wherein the first IAM system is configured to:

initiate a cross-border access request with the second IAM system, and wherein the cross-border access request is initiated based on a request to perform an access governance operation originating in the first legal entity;

make a determination of whether to approve or deny the cross-border access request with the second IAM system, wherein the determination is based on one or more access control policies of the first legal entity;

transmit the cross-border access request to the second IAM system in response to determining the cross-border access request is approved by the first IAM system, wherein the second IAM system determines whether to approve or deny the cross-border access request;

receive a response from the second IAM system, the response indicating whether the cross-border access request is approved by the second IAM system based on the one or more access control policies of the second legal entity;

determine that a final approval status for the cross-border access request is approved by both the first legal entity and the second legal entity; and execute the access governance operation in response to determining that the final approval status indicates approval of the cross-border access request by both the first and second IAM systems.

15. The system of claim 14, wherein the first IAM system and the second IAM system manage segregated data environments between the first legal entity and the second legal entity, wherein the first identity datastore and the first entitlement datastore are segregated from the second identity datastore and the second entitlement datastore.

16. The system of claim 14, wherein the first IAM system is further configured to:

receive the request to perform the access governance operation associated with the second IAM system, wherein the access governance operation comprises synchronizing identity information between the first IAM system and the second IAM system;

determine new identity information is added to the first identity datastore after a prior synchronization between the first identity datastore and the second identity datastore; and transfer the new identity information to the second IAM system.

17. The system of claim 14, wherein the first IAM system is further configured to:

receive the request to perform the access governance operation associated with the second IAM system, wherein the access governance operation comprises verifying entitlement compliance with separation of duty (SoD) policies for the first entitlement datastore of the first IAM system and the second entitlement datastore of the second IAM system;

transmit a first set of entitlements from the first entitlement datastore to a second SoD reviewer of the second IAM system, wherein the second SoD reviewer is configured to evaluate the first set of entitlements for conflicts with a second set of entitlements in the second entitlement datastore, based on predetermined SoD rules;

receive a notification of a conflict between the first set of entitlements and the second set of entitlements; and perform a remediation action based on the notification of the conflict between the first set of entitlements and the second set of entitlements.

18. The system of claim 14, wherein the second IAM system is configured to:

create an entitlement model with a plurality of entitlements, wherein each of the plurality of entitlements in the entitlement model defines a role, permission, access level, or cross-border access for first legal entity users of a first legal entity application, and wherein the first legal entity application is hosted by the first legal entity;

create a second entitlement mapping for second legal entity users based on the entitlement model for the first legal entity application; and wherein the first IAM system is further configured to:

receive the request to perform the access governance operation associated with the second IAM system, wherein the access governance operation comprises reconciling the second entitlement mapping for the second legal entity users with a first entitlement mapping for the first legal entity users;

create the first entitlement mapping for a second legal entity application by the first legal entity users based on the second entitlement mapping for the first legal entity application; and store the first entitlement mapping, and the second entitlement mapping in the first entitlement datastore associated with the first legal entity.

19. The system of claim 14, wherein the request to perform the access governance operation is generated based on a predetermined policy for anyone of: an updated entitlement, a new entitlement model, or a predetermined duration since a last synchronization event.

20. The system of claim 14, wherein:

the first geographic jurisdiction is subject to a first data privacy regulation and is not subject to a second data privacy regulation; and the second geographic jurisdiction is subject to the second data privacy regulation and is not subject to the first data privacy regulation.

* * * * *